R. NORDIN.
CONVERTIBLE CHAIR AND COUCH.
APPLICATION FILED NOV. 5, 1910.

1,018,074.

Patented Feb. 20, 1912.

2 SHEETS—SHEET 1.

Witnesses.
A. H. Opsahl.
Harry Opsahl.

Inventor.
Robert Nordin
By his Attorneys
Williamson Merchant

R. NORDIN.
CONVERTIBLE CHAIR AND COUCH.
APPLICATION FILED NOV. 5, 1910.
1,018,074.
Patented Feb. 20, 1912.
2 SHEETS—SHEET 2.
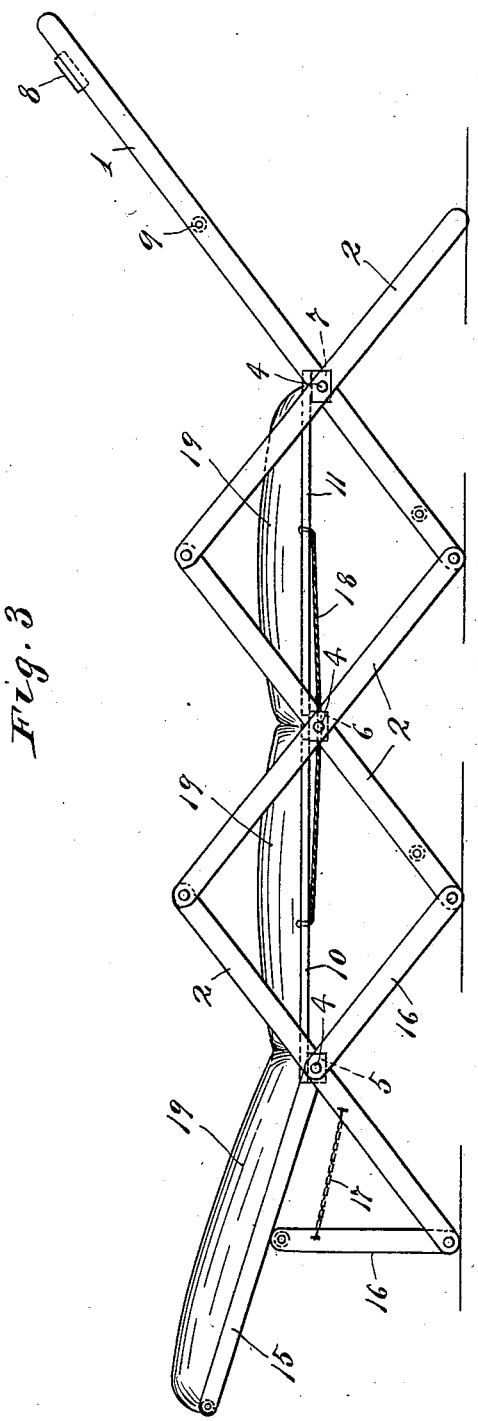
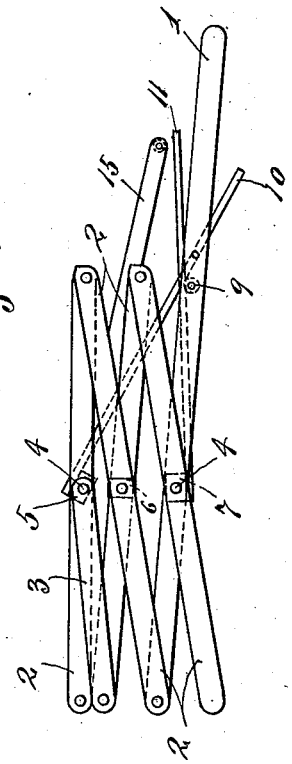
Witnesses.
A. H. Opsahl.
Harry Opsahl.
Inventor.
Robert Nordin
By his Attorneys
Williamson Merchant

UNITED STATES PATENT OFFICE.

ROBERT NORDIN, OF BROOKSIDE, MINNESOTA.

CONVERTIBLE CHAIR AND COUCH.

1,018,074. Specification of Letters Patent. Patented Feb. 20, 1912.

Application filed November 5, 1910. Serial No. 590,828.

*To all whom it may concern:*

Be it known that I, ROBERT NORDIN, a citizen of the United States, residing at Brookside, in the county of Hennepin and State of Minnesota, have invented certain new and useful Improvements in Convertible Chairs and Couches; and I do hereby declare the following to be a full, clear, and exact description of the invention, such as will enable others skilled in the art to which it appertains to make and use the same.

My invention has for its object to provide a convertible chair and couch which is adapted, when out of use to be folded into very small space, and to such ends, the invention consists of the novel devices and combinations of devices hereinafter described and defined in the claims.

In the accompanying drawings which illustrate the invention, like characters indicate like parts throughout the several views.

Figure 1:
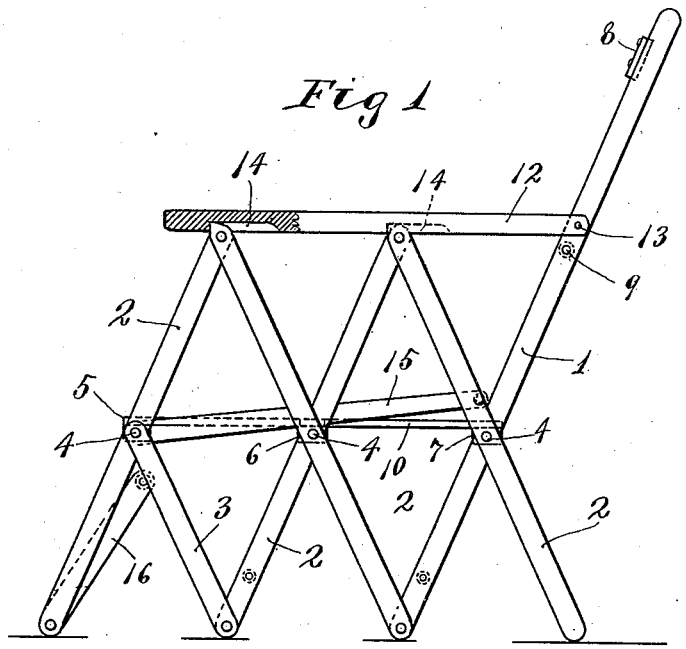
Figure 2:
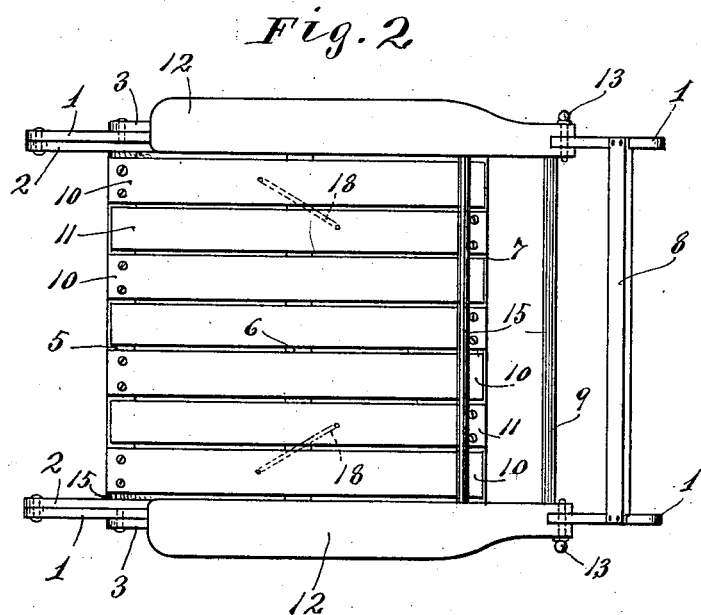

Referring to the drawings, Figure 1 is a view in side elevation showing the device adjusted for use as a chair; Fig. 2 is a plan view of the device adjusted as shown in Fig. 1; Fig. 3 is an elevation showing the device adjusted for use as a couch or bed; and Fig. 4 shows the device folded.

The sides of the combined chair and couch are afforded by a pair of laterally spaced lazy tongs made up of bar members 1, 2, and 3 pivotally connected at their ends and intermediate portions. At their intermediate joints, the said bars are pivotally connected to the projecting trunnions 4, of cross bars 5, 6 and 7. The upper ends of the bars 1 are extended above the upper ends of the bars 2 to afford a seat back, and these extensions are, as shown, connected by a cross bar 8 and a tie rod 9.

The bottom of the seat of the couch or bed is made up of a multiplicity of slats 10 and 11, the slats 10 being secured at their front ends to the pivoted cross bar 5, and the said slats 11 being secured at their rear ends to the cross bar 7. When the device is adjusted for use as a chair, as shown in Fig. 1 and Fig. 2, the loose ends of the slats 10 rest upon the rear cross bar 7 and the front ends of the slats 11 rest upon the front cross bar 5, thereby making a complete chair bottom. When the device is adjusted for use as a chair, the lazy tong members, made up of the bars 1, 2, and 3 are prevented from spreading or extending in a direction from the front to the rear of the device, by means of arm rests or boards 12, the rear ends of which are detachably pivoted to the long bars 1, preferably, by means of pins 13. In their under sides the arm rests 12 are formed with notches or recesses 14 that receive angular upper ends of the frame bars 2, as best shown in Fig. 1, and lock the lazy tong members so that they cannot extend. The device when thus adjusted for use as a chair may be used either with or without cushions and it will afford a large and easy chair which is light enough to be easily handled or moved about.

To adapt the folding chair described to be converted into a couch or bed, two bail-like frame members 15 and 16 are pivoted to the front members 2 of the lazy tong side members. The frame member or extension 15 is much longer than the lower member 16 and it is pivoted on the trunnions 4 of said front bars 2. The lower member 16 is pivoted to the extreme lower ends of the said front legs 2 and when it is turned forward it is adapted to support the frame member 15 in position to afford a head end extension of the couch or bed, in Fig. 3, which shows the device adjusted for use as a couch or bed. The extreme forward movement of the frame member 16 is shown as limited by a small flexible connection 17 attached thereto, and to the front bars 2; and the extending or lengthening movement of the lazy tong side frame are shown as limited by a pair of flexible connections or ropes 18 attached to adjacent slats 10 and 11. When the device is extended to form the bed, as shown in Fig. 3, the free ends of the slats 10 and 11 are drawn out so that they rest only on the intermediate cross bar 6 and thus approximately double the length of the botom support afforded thereby.

The bail-like frame member 15 is preferably provided with suitable intermediate cross rods or stays adapting it to support a cushion. A three sectioned cushion 19, preferably connected by flexible joints, is shown in Fig. 3 as applied on the frame extension 15 and on the extended slats 10 and 11 so as to afford a mattress to the couch or bed. The device, when adjusted as shown in Fig. 3, affords a very comfortable couch or bed which, in the day-time, may be very easily and quick converted into an easy chair, or if not desired for use as a chair, may be folded into a very small space as shown in Fig. 4. When thus folded, it may be easily carried about or stored in a very small space.

When the device is adjusted for use as a chair, the bail-like extension frame or member 15 is adapted to be turned over the top of the seat slats 10 and 11, and the lower bail-like supporting frame 16 is adapted to be turned backward out of the way, all as clearly shown in Figs. 1 and 2.

A convertible and folding chair and couch or bed of the character described is, of course, especially serviceable in places where a room which must be used in the day-time as a living room, must be used at night time as a sleeping apartment. It would also be found very serviceable for use on porches and in tents and for the various different uses where the device must be carried from place to place. Furthermore, the device, while serviceable for the several purposes above stated, may be constructed at small cost and may be made strong and durable.

What I claim is:

1. A convertible chair and couch comprising lazy tong side members having at their intermediate joints, front, rear and intermediate cross bars, and alternated slats secured to the said front and rear cross bars, adapted, when the device is adjusted for use as a couch, to be drawn apart endwise and rested upon the said intermediate cross bar at their free ends, and a flexible stop connection attached to reversely movable members of the said alternated slats.

2. In a convertible chair and couch, the combination with lazy tong side frames having one of the end members extended to afford a chair back and having at their intermediate joints, front, rear and intermediate cross bars, of alternated slats secured to the said front and rear cross bars and arranged to slide endwise over said intermediate cross bar, means for limiting the extending movement of said side frames, a head end extension frame pivoted to the front portion of the said side frames, and a lower bail-like supporting frame pivoted to the lower portion of the front bars of said side frames and adapted to support the said extension frame in working position.

3. A convertible chair and couch having lazy tong side frames and provided with an extensible seat, and provided with arm rests that are detachably secured to said lazy tong side frames and hold the same against extending movements, substantially as described.

4. A convertible chair and couch having lazy tong side frames with back forming extensions and provided with an extensible seat, and provided with arm rests that are detachably connected to the back extensions of said side frames and to the upper pivotal connected ends of other members of said side frames and hold the same against extending movements, substantially as described.

5. A convertible chair and couch having lazy tong side frames with back forming extensions and provided with an extensible seat, and provided with arm rests that are detachably pivoted to the back extensions of said side frames and have recesses that interlock with the upper pivotally connected ends of other members of said side frames, substantially as described.

6. A convertible chair and couch having lazy tong side frames and provided with an extensible seat, and provided with arm rests arranged for movements into and out of engagement with said lazy tong side frames for holding the same against extending movements, substantially as described.

In testimony whereof I affix my signature in presence of two witnesses.

ROBERT NORDIN.

Witnesses:
HARRY D. KILGORE,
FRANK D. MERCHANT.

---

Copies of this patent may be obtained for five cents each, by addressing the "Commissioner of Patents, Washington, D. C."